UNITED STATES PATENT OFFICE.

THOMAS B. JOSEPH, OF MERCUR, UTAH.

GOLD-EXTRACTION PROCESS.

SPECIFICATION forming part of Letters Patent No. 725,257, dated April 14, 1903.

Application filed September 3, 1901. Serial No. 74,212. (No specimens.)

*To all whom it may concern:*

Be it known that I, THOMAS B. JOSEPH, a citizen of the United States, residing at Mercur, in the county of Tooele and State of Utah, have invented certain new and useful Improvements in Gold-Extracting Processes; and I do hereby declare the following to be a full, clear, and exact description of the invention, such as will enable others skilled in the art to which it appertains to make and use the same.

My invention relates to the extraction of precious metals, but more particularly to gold, and has for its object to extract gold from ore containing the same when in a suitable condition.

A further object of my invention is to provide a process for extracting precious metals which can be used on base, oxidized, or mixed ores and which will not be neutralized by the presence of arsenic or sulfur and which will leach both roasted and unroasted ores.

It must be understood that I cannot state definitely how fine the ore should be crushed, as loose sand ore should be leached in its natural state, while soft ores should not be crushed as fine as hard or base ores, the process of crushing depending entirely upon the quality, impenetrability, and hardness of the ore to be leached.

In carrying out my invention after the ore has been crushed as aforesaid I subject the same to the leaching solution composed of water, cyanid of potassium, bromin, hydrate of calcium, and carbon dioxid, in conjunction with the compressed air, conveyed upward therein through the bottom from an air-compressor.

In carrying out my process such vessels as have been found to be most practical in the extracting of gold are used, although I prefer those made of wood, as metal will be more or less subject to the chemical action of the leaching solution, and I prefer to have the storage-tank standing at one side at a higher elevation than the ore-leaching tank, so that the leaching solution will run by the force of gravity into the tank containing the ore. The leaching solution, composed of water, cyanid of potassium, bromin, and hydrate of calcium, is made in the storage-tank, and when carbon dioxid is desired to be used the same may either be admitted and mixed with the solution in the storage-tank or with the solution in the leaching-tank containing the ore. When carbon dioxid is used, the same may be obtained from burning limestone into oxid of lime and the gas be conveyed by a pipe either into the solution in the leaching-tank or in the storage-tank, as desired, or it may be obtained from well-burned coal-smoke after the sulfur has been extracted from the smoke, or it might be obtained by using carbureted water, such as is used at soda-fountains, and it be conveyed into the leaching solution in like manner, as above described. The compressed air is conveyed into the tank of ore being leached through a series of small openings in the filter-bottom for the purpose of agitating the ore, as well as to help to convey the slimes, if any, therein toward the top in order to aid the percolation of the solution through the ore and to neutralize the ore acids, and especially the sulfur in the ore. Great care must be taken, however, not to admit the air under too great a pressure, as "channeling" might result, which would retard the leaching of the ore.

The carbon dioxid in the solution, moreover, neutralizes to some extent the alkalinity of the solution and helps to neutralize any sulfuric acids in the ore, which would otherwise be injurious in a cyanid-of-potassium solution by tending to retain or precipitate the precious metals back into the tailings. Carbon dioxid also helps to dissolve hydrate of lime therein, and thereby quickly conveys the same into the ore as soon as the solution can penetrate to there form an insoluble compound with the lime hydrate and the sulfur or arsenic in either the ore or in the solution—as, for instance, redalgar or orpiment—thereby preventing injury to the cyanid solution and the cyanids of the precious metals. Bromin in the solution will at once attack the cyanid of the potassium and liberate the nascent cyanogen and form the cyanogen bromid therewith. If there were no free oxygen in the solution, a part of the bromin would combine with the potassium of the cyanid of potassium and form bromid of potassium; but free oxygen in the solution will again liberate the bromin, which will then join with the free cyanogen and form cyanogen bromid.

I might use the liquid bromin; but I prefer to use the bromin in the liquid form and in about the proportion of one ounce to each ton of the solution, although I do not confine myself to any particular proportion, as some ores will require a larger or lesser amount of bromin and also vary the proportions of the other chemicals in the solution.

As it is expedient to have free potassium cyanid present with the cyanogen bromid, it is advisable to remove the cyanid-destroying compounds, either by washing with water before the leaching is commenced or else to use carbon dioxid, hydrate of calcium, and compressed air therein to neutralize the cyanid-destroying compounds, which latter work I prefer. Cyanogen bromid has far greater activity and power as a solvent to extract precious metals from ore in the presence of free oxygen and hydrate of calcium in the alkaline solution than cyanogen has. If there is an excess of bromin present, then brown paracyanogen is formed; but experiments show that a weak solution of bromin is the most efficient. It will also be observed that while a very weak amount of carbon dioxid in water will precipitate calcium, yet a larger amount of carbon dioxid therein will dissolve calcium hydrate or the milk of lime the more and help to clarify the solution. Carbon dioxid in the solution greatly penetrates limestone ores and by carrying the nascent cyanogen and cyanogen bromid with it greatly facilitates the leaching of this kind of ore, as the nascent cyanogen or the cyanogen bromid does not combine with the carbon dioxid, as their further chemical combinations do not take place until they come in contact with the metals of the ore. I have found that carbon dioxid in this solution is of much more value in this connection than the bicarbonates of potassium, sodium, or ammonium, for the reason that the alkalies of those metals would be injurious, because they would tend to dissolve base ores into the solution and foul it, as they make the solution too alkaline.

When it is desired to hasten the process of leaching or to prevent the solution from freezing in winter, the compressed air may be heated by a heating-furnace, through which a coil of the air-pipe passes. The oxygen from the compressed air will not only liberate the nascent cyanogen quickly, but will also furnish plenty of free oxygen to assist the nascent cyanogen and the cyanogen bromid in their work, as well as to help to neutralize the injurious effects of sulfur in the ores, thereby facilitating a better extraction of gold from arsenical and sulfurous ores by the nascent cyanogen and cyanogen bromid in the alkaline solution containing carbon dioxid, hydrate of calcium, and freed oxygen therein. Were it not for the hydrate of calcium and freed oxygen from the compressed air and the cyanogen bromid therein, some of said ores would have to be roasted, thus making the process much more expensive, and consequently detracting from the value of the ores.

I wish to be understood as distinguishing between the use of hydrate of calcium and oxid of lime, and lay no claim to the latter, for the reason that the dissolving of the same into the hydrate of calcium in the leaching liquor is so slow that the ore acids have injured the cyanid of potassium and cyanids of the precious metals before the oxid of lime is dissolved, thus rendering its use of little or no benefit to neutralize ore acids until after the ore acids have done their harmful work. Hydrate of calcium, however, is thoroughly mixed with the leaching liquor before the same has been run on the ore, either upwardly or downwardly, to be leached. Hydrate of calcium, compressed air, and carbon dioxid in the solution immediately neutralize the most of the baseness or refractory nature of the ore.

As a general rule there should be used about two and one-half pounds of cyanid of potassium to each ton of the solution, though oftentimes a stronger or weaker solution will be found beneficial, as circumstances may require. The presence of the cyanogen bromid, carbon dioxid, hydrate of calcium, and compressed air assists the leaching to such a degree that a lesser amount of cyanid of potassium can be used than heretofore has been the custom.

As a general rule there should be about one ounce of bromin used, as heretofore stated, and about six ounces of carbon dioxid to the ton of water. Also I use about one pound of oxid of lime dissolved into the hydrate of calcium to each ton of the solution, in addition to any dust of oxid of lime that might be added or scattered into the ore when the latter is dumped into the tank to be leached, to sweeten the same to prevent any bad odor that might afterward occur when emptying out the tailings.

After the ore is leached the solution is drained off into another tank, from whence it may be drained through boxes containing zinc-shavings or charcoal, or both, for the precious metals to be precipitated therein, or the precious metals may be precipitated from the solution by electricity or with zinc-dust stirred therein, though I prefer to use zinc-dust. The leaching liquor can then be pumped from there or from a sump-tank when run into it or from the gold-tank without any precipitation of its metal back to the storage-tank, as desired, to there be replenished to the desired quantity and strength in order to use again to leach the same or other ore.

When desiring to finish up a tank of leaching ore, a wash-water should be run through it to wash out as much as is convenient of the remaining cyanids of the metals as may have remained therein and be saved to again use as a wash-water or to replenish the quantity of the strong solution after the metal is precipitated from said wash-water. In this way the wash-water may be used over and over again as often as desired, the pipes connecting the different tanks and pumps being provided with stop-cocks, so as to control and regulate the flow of the leaching liquor and also the compressed air.

I lay no claim to the apparatus, nor do I claim, broadly, the use of compressed air nor any particular mode of precipitation of the precious metals, nor do I wish to be understood as claiming an alkaline earth in the solution, as potassium, sodium, or ammonium, but confine myself to hydrate of calcium, for the reason that the aforementioned earths being too alkaline are injurious, especially as they help to dissolve base metals in the solution, and thereby foul it, while the hydrate of calcium neutralizes the base acids of sulfur and arsenic, if any therein, and thus prevents the sulfur from dissolving base metals to foul the solution and also prevents the ore acids from attacking the cyanids of the precious metals and precipitating them back into the tailings.

What I claim as new, however, and desire to secure by Letters Patent of the United States, is—

1. The herein-described process of extracting gold and silver from ore containing the same, when in a suitable condition, which consists in subjecting the said ore to a leaching action of a solution of water, cyanid of potassium, bromin, hydrate of calcium, and carbon dioxid, intimately mixed together, and simultaneously agitating the ore by compressed air being forced upward through the same, substantially as described.

2. The herein-described process of extracting gold and silver from ore containing the same, when in a suitable condition, which consists in subjecting the said ore to a leaching action of a solution of water, cyanid of potassium, bromin, hydrate of calcium and forcing carbon dioxid in the leaching solution simultaneous with compressed air.

3. The herein-described process of extracting gold or precious metals from ore containing the same, when in a suitable condition, which consists in subjecting the said ore to a leaching action of a solution of water, cyanid of potassium, bromin and hydrate of calcium and simultaneously agitating the ore with compressed air, substantially as described.

4. The herein-described process of extracting precious metals from ore containing the same, when in a suitable condition, which consists in subjecting the said ore to a leaching action of a solution of water, cyanid of potassium, hydrate of calcium, carbon dioxid and bromin, and subsequently precipitating the precious metals from the solution, substantially as described.

In testimony whereof I affix my signature in presence of two witnesses.

THOMAS B. JOSEPH.

Witnesses:
RICHARD PELTON,
C. H. WORDEN.